United States Patent [19]
Rikken et al.

[11] Patent Number: 5,384,883
[45] Date of Patent: Jan. 24, 1995

[54] OPTICAL COMPONENT AND OPTOELECTRONIC ELEMENT FOR INCREASING THE FREQUENCY OF ELECTROMAGNETIC RADIATION

[75] Inventors: Gerardus L. J. A. Rikken; Antonius H. J. Venhuizen, both of Eindhoven, Netherlands

[73] Assignee: U.S. Philips Corporation, New York, N.Y.

[21] Appl. No.: 106,155

[22] Filed: Aug. 12, 1993

[30] Foreign Application Priority Data

Aug. 13, 1992 [EP] European Pat. Off. ............ 92202497

[51] Int. Cl.⁶ .................................. G02F 1/35
[52] U.S. Cl. ................................ 385/122; 385/130; 385/131; 385/132
[58] Field of Search ................ 385/122, 123, 129, 130, 385/131, 132, 14, 50; 372/21; 359/326, 332, 328

[56] References Cited

U.S. PATENT DOCUMENTS

| | | | |
|---|---|---|---|
| 4,973,117 | 11/1990 | Yamada | 385/122 X |
| 4,974,923 | 12/1990 | Colak et al. | 385/122 X |
| 4,981,614 | 1/1991 | Miyazaki et al. | 385/122 X |
| 5,011,623 | 4/1991 | Yoshinaga et al. | 385/122 X |
| 5,106,211 | 4/1992 | Chiang et al. | 385/122 X |

OTHER PUBLICATIONS

"Non Linear Integrated Optics" G. I. Stegeman and C. T. Seaton in Journal of Applied Physics, 58 (12) 1985 15 Dec. 1985.
"Poled Polymers for Frequency Doubling of Diode Lasers" Rikken et al, Applied Physics Letters vol. 58 (5) Feb. 4, 1991 pp. 435–437.
"Nonlinear Optical Properties of Organic Molecules and Crystals" D. S. Chemla and J. Zyss, Accademic Press, 1987, pp. 426–427 No Month.
"Efficient Modal Dispersion Phase–Matched Frequency Doubling in Poled Polymer Waveguides" Rikken et al, Applied Physics Letters, vol. 62, No. 20, May 17, 1993, New York.

*Primary Examiner*—John D. Lee
*Assistant Examiner*—Phan Thi Heartney
*Attorney, Agent, or Firm*—William L. Botjer

[57] ABSTRACT

An optical component (7) is disclosed in which the frequency of electromagnetic radiation is increased and which comprises a non-linear optical waveguide (11) which is provided on a supporting material (9). The field distributions of the fundamental wave and the frequency-increased wave can be made to overlap by providing a satellite layer (15) having a high refractive index on at least one side of the non-linear optical waveguide (11), so that the efficiency of the frequency is high. The invention also relates to an optoelectronic element (1) for increasing the frequency of electromagnetic radiation, comprising a frequency-increasing element in the form of such a component (7).

6 Claims, 7 Drawing Sheets

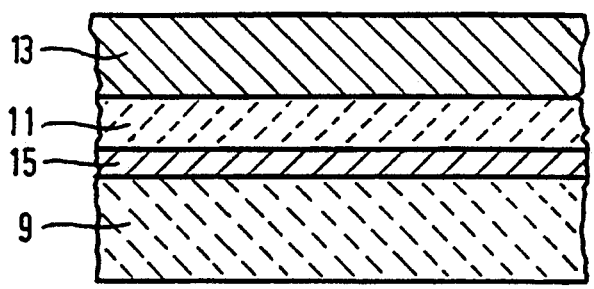
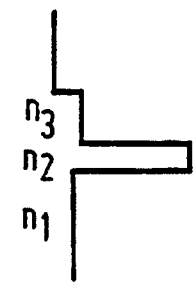
FIG.4a  FIG.4b
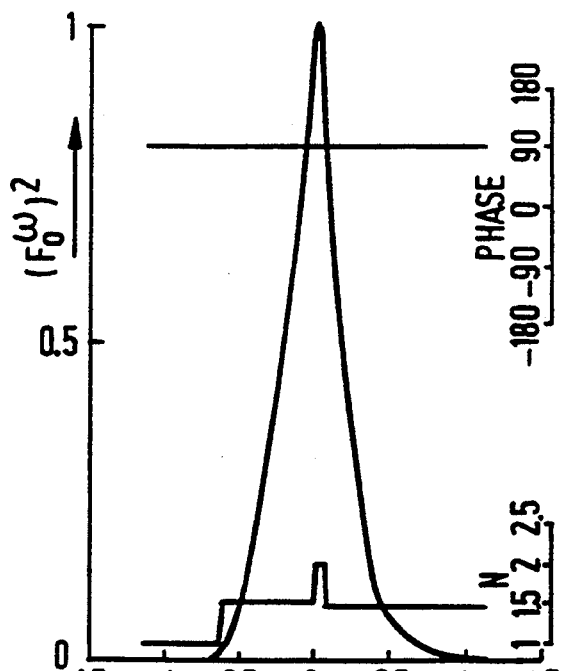
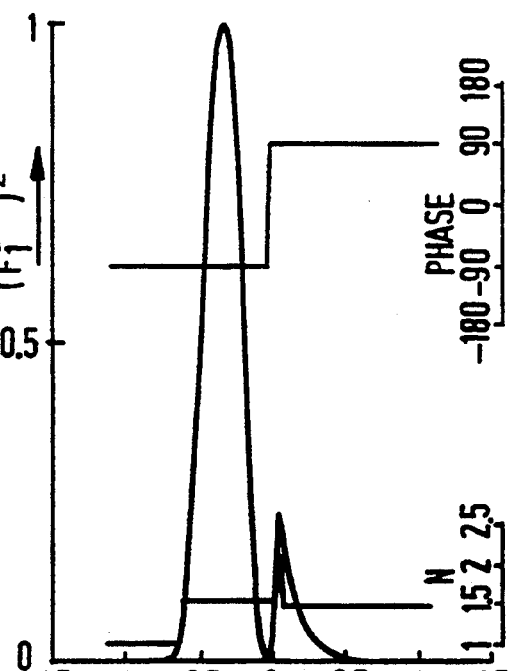
FIG. 5a  FIG. 5b
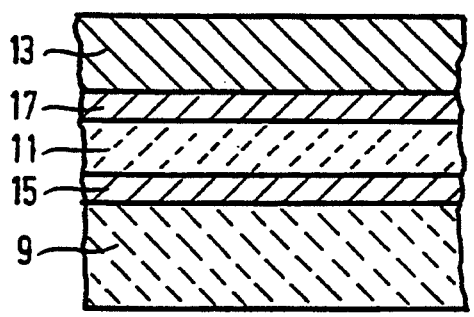
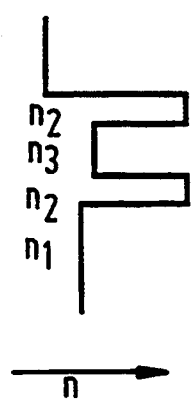
FIG.6a  FIG.6b

OPTICAL COMPONENT AND OPTOELECTRONIC ELEMENT FOR INCREASING THE FREQUENCY OF ELECTROMAGNETIC RADIATION

BACKGROUND OF THE INVENTION

The invention relates to an optical component for increasing the frequency of a fundamental wave of electromagnetic radiation, which component comprises a substrate and a non-linear optical waveguide having a refractive index which is higher than that of the substrate, phase matching occurring between mutually different modes of the fundamental wave and a higher-harmonic wave.

The invention also relates to an optoelectronic element for increasing the frequency of electromagnetic radiation which comprises such a component.

Frequency increasing is to be understood to mean herein frequency doubling as well as an increase of the frequency by a factor approximately equal to two. Frequency doubling is very advantageously used in apparatus such as laser printers and scanners and in optical apparatus for the reading and/or writing of an optical record carrier, because the information density in this carrier can thus be increased. The frequency increase by a factor approximately equal to two can be achieved by combining radiation from two radiation sources, the increased frequency being equal to the sum frequency of the frequencies of the radiation emitted by the radiation sources.

In the case of frequency doubling of electromagnetic radiation in a waveguide of a non-linear optical material, the fundamental wave and the second-harmonic wave generated in the non-linear optical material propagate at different speeds.

This difference in speed occurs only after a pan of the fundamental wave has been convened into a higher-harmonic wave. Consequently, parts of the higher-harmonic wave generated at different positions along the component will have different phases, so that destructive interference is liable to occur between these parts, with the result that the frequency-increased radiation extinguishes.

Therefore, for efficient second-harmonic generation it is necessary to match the phase of the fundamental wave and the phase of the second-harmonic wave. This means that the effective refractive indices of the non-linear optical material for the fundamental wave and the second-harmonic wave must be equal. In other words, the refractive index difference $\Delta n$ for the two waves, given by $\Delta n = n^{\omega}_{eff} - n^{2\omega}_{eff}$ must be equal to zero. Therein, $n^{\omega}_{eff}$ is the effective refractive index for the fundamental wave and $n^{2\omega}_{eff}$ is the effective refractive index for the second-harmonic wave. Such phase-matching, however, is impeded by the phase drift occurring due to the wavelength dispersion in the material whose refractive index varies as a function of the wavelength. Consequently, the intensity of the second-harmonic wave oscillates around a comparatively low value over the length of the waveguide.

The publication "Non linear integrated optics" by G. I. Stegeman and C. T. Seaton in J. Appl. Phys. 58 (12), 1985, describes a waveguide of the kind set forth in which phase matching is realised by elimination of the wavelength dispersion by way of modal dispersion.

In the cited publication phase matching is achieved by a suitable choice of the layer thickness of the waveguide layer, so that $\beta(2\omega) = 2\beta(\omega)$, where $\beta$ is the propagation constant and $\omega$ and $2\omega$ are the frequency of the fundamental wave and the second-harmonic wave. In addition to the layer thickness of the optically non-linear material, the refractive index of the material is also of importance for the fundamental and the higher-harmonic frequency. An optical wave consists of different (m) modes which exhibit a respective different field distribution $F_m$ for a given refractive index profile and experience a different effective refractive index $n_{eff,m}$, the effective refractive index decreasing as the order increases. For phase matching, the effective refractive index for the selected mode of the fundamental wave and the effective refractive index for the selected mode of the second-harmonic wave should be equal. When the material and the thickness of the waveguide layer are suitably chosen, the second-harmonic wave will propagate in a higher order than the fundamental wave ($n^{\omega}_{eff,i} = n^{2\omega}_{eff,j}$, $j > i$) and it can be achieved that the wavelength dispersion is exactly cancelled by the modal dispersion.

The comparatively low efficiency of the second-harmonic generation is a drawback of this phase-matching method. This efficiency is proportional to the degree of overlapping of the field distributions of the fundamental wave and the second-harmonic wave and is determined by the so-called overlap integral. When the orders of the selected modes of the fundamental wave and of the second-harmonic wave differ, as is the case in the event of phase matching by means of modal dispersion, the value of the overlap integral is generally very small and the efficiency is low. Moreover, because the intensity of the second-harmonic wave is highly dependent on the layer thickness, for such phase matching very severe requirements must be imposed as regards the layer thickness, so that the manufacture of the frequency-increasing component is intricate and expensive.

SUMMARY OF THE INVENTION

It is an object of the invention to provide a frequency-increasing optical component, and an optoelectronic element comprising such a component, in which phase matching is realised by modal dispersion and in which the frequency increase is realised with a substantially higher efficiency, without it being necessary to satisfy severe requirements as regards the layer thicknesses.

To achieve this, the waveguide in accordance with the invention is characterized in that on at least one side of the waveguide there is provided a satellite layer which has a refractive index which is higher than that of the waveguide.

The invention is based on the recognition of the fact that through matching of the field distributions of the fundamental wave and the frequency-increased wave the overlap can be increased between the mode of the fundamental wave and the mode of the second-harmonic wave, wherebetween phase matching occurs due to modal dispersion and that this matching can be realised by the deposition of an additional layer having a high refractive index.

A first embodiment of the optical component is further characterized in that a second satellite layer is provided on a second side of the non-linear optical waveguide, which second layer has a refractive index which is higher than that of the waveguide.

This symmetrical embodiment of the waveguide offers the advantage that a higher frequency increasing efficiency is possible than in the presence of only one satellite layer. When use is made of specific non-linear optical materials, for example an organic polymer, the deposition of the second satellite layer on the layer of non-linear optical material may be problematic in practice, because deposition must take place at a high temperature. In these specific cases an embodiment comprising only one satellite layer, being situated underneath the frequency increasing layer, is to be preferred.

In this asymmetrical embodiment, the field distributions of the fundamental and the higher-harmonic wave, and hence also the modes of these waves for which the overlap integral is maximum, will be different from those in the symmetrical embodiment.

The optical component may be a planar guide whose dimension transversely of the propagation direction of the radiation and in a plane parallel to the various layers is not substantially smaller than the dimension in the propagation direction. The optical component in accordance with the invention, however, preferably is further characterized in that it is constructed as a channel waveguide.

It is known per se that the power density can be substantially increased, due to the confinement of the radiation in the channel, by utilizing a channel waveguide instead of a planar waveguide. As a result, the yield of second-harmonic generated radiation will increase substantially.

A preferred embodiment of the optical component in accordance with the invention is characterized in that the non-linear optical material is a polymer.

A polymer layer of this kind is described in the article "Poled polymer for frequency doubling of diodelaser" in Appl. Phys. Lett. Vol. 58 (5), Feb. 4, pp. 435–7. However, therein the extinguishing of the frequency-doubled radiation is not prevented by the phase matching considered herein, but by the so-called quasi-phase matching which is achieved in that the frequency increasing layer exhibits a periodic spatial modulation of the non-linearity. This periodicity can be achieved by periodic modulation of the electric field whereby the polymer is poled during the manufacture of the layer.

A polymer has the advantage that it is a material which has a comparatively low refractive index and can be deposited in a thin layer. The comparatively low refractive index allows for a broad choice as regards the material for the satellite layers.

The optical component in accordance with the invention is preferably further characterized in that the satellite layer consists of $Si_3N_4$.

The use of $Si_3N_4$ offers the advantage that the complete structure of the component can be manufactured using standard silicon technology.

The invention also provides an optoelectronic element for increasing the frequency of a fundamental wave of electromagnetic radiation, which element comprises a support on which there is provided a diode laser for generating the electromagnetic radiation and an optical component in which the frequency increase takes place, characterized in that the optical component is a component as described above, the active layer of the diode laser and the layer of the component in which the fundamental wave propagates being situated one in the prolongation of the other, the exit face of the diode laser and the entrance face of the component being situated so as to face one another.

BRIEF DESCRIPTION OF THE DRAWING

The invention will be described in detail hereinafter with reference to the drawing. Therein:

FIG. 4 is a sectional view of an embodiment of an optical component in accordance with the invention, comprising a single satellite layer, together with the associated refractive index profile;

FIGS. 5a and 5b show the field distributions of the zero-order mode of the fundamental wave and the second-order mode of the second-harmonic wave, respectively, for an optical component comprising one satellite layer;

FIG. 6 is a sectional view of an embodiment of an optical component in accordance with the invention, comprising two satellite layers, together with the associated refractive index profile;

DETAILED DESCRIPTION OF THE PREFERRED EMBODIMENTS

Figure 1:
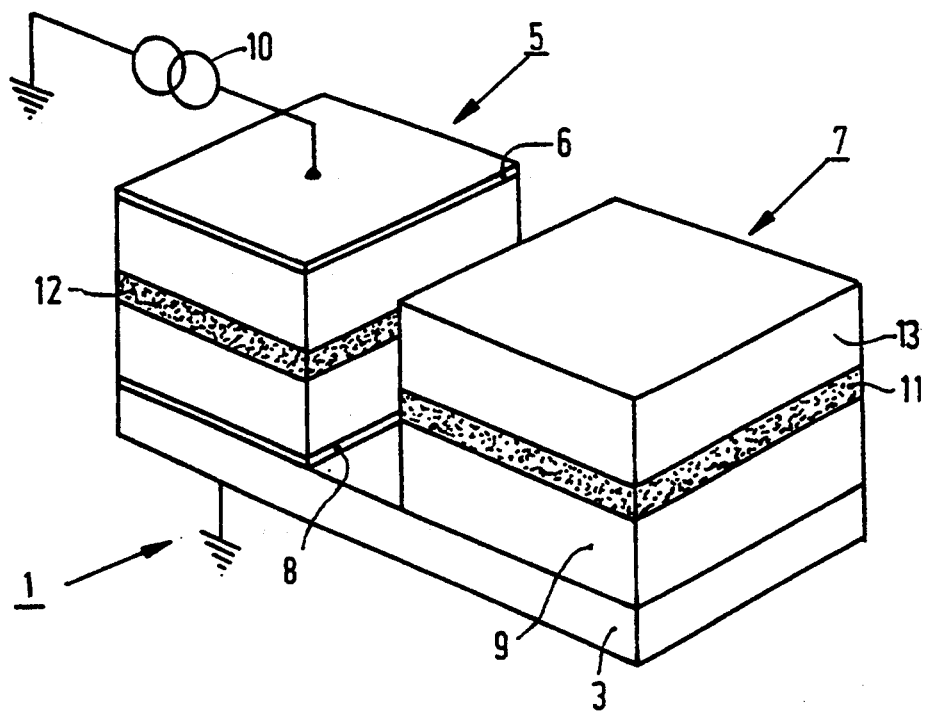
FIG. 1 shows diagrammatically an optoelectronic element comprising an optical component in accordance with the invention.

FIG. 1 shows diagrammatically an optoelectronic element 1 for increasing the frequency of electromagnetic radiation. An element 1 of this kind can be used in various optical apparatus such as laser printers, scanners and in apparatus for reading out and/or writing on an optical record carder. By increasing, for example doubling, the frequency of the primary radiation emitted by a radiation source, the size of the scanning spot in these apparatus can be reduced, for example halved, so that the resolution of this apparatus is increased, for example doubled, with the result that the density of the information that can be read and/or written by means of this apparatus is increased. Notably for a "writing" apparatus such as a laser printer or a write apparatus for optical record carriers, it is important that the frequency-increased radiation is of sufficient power, so that the frequency conversion should be performed with a sufficiently high efficiency. Herein, the efficiency is to be understood to mean the quotient of the power of the frequency-increased radiation and the power of the primary radiation. By way of example, only the term frequency doubling will be used hereinafter.

The optoelectronic element 1 consists of a support 3 on which there is provided a radiation source 5, for example a diode laser, for generating the electromagnetic radiation. Via electrodes 6, 8, the diode laser 5 is connected to a current source 10. When an electric current is applied to the diode laser via the electrodes 6, 8, electromagnetic radiation having a fundamental wavelength $\lambda$ is generated in the active layer 12. The support 3 also accommodates an optical component 7 in which frequency doubling of the radiation generated by the radiation source 5 takes place. Such a component 7 consists of a supporting material 9, the so-called substrate, which is made of, for example silicon and which has a refractive index $n_1$, a waveguide 11 of a non-linear optical material having a refractive index $n_2$ being provided on said substrate; $n_2$ must be higher than $n_1$ in order to confine the radiation in the waveguide 11 by total internal reflection. On the waveguide there may be provided a cladding layer 13 having a refractive index $n_3$, where $n_3 < n_2$. When the substrate is made of silicon, in practice a layer of silicon dioxide ($SiO_2$) will also be provided thereon for optical separation of the inherently absorbing substrate material from the other layers. However, when the $SiO_2$ layer is of sufficient thickness, the substrate may consist of exclusively this layer.

The diode laser 5 and the component 7 are aligned relative to one another on the support 3 so that the active layer 12 of the diode laser 5 and the layer of the component 7 in which the fundamental wave propagates are situated one in the prolongation of the other. Thus, when the elements 5 and 7 are positioned near one another, i.e. at a distance of the order of microns, radiation originating from the diode laser 5 will be efficiently coupled into the component 7 in which subsequently frequency doubling takes place.

As is known, one of the requirements to be satisfied in order to achieve efficient frequency doubling consists in that the fundamental wave of the electromagnetic radiation and the frequency-doubled wave in the frequency doubling layer propagate in phase. A phase difference results in a comparatively low yield of frequency-doubled radiation due to destructive interference between the second-harmonic waves generated in different positions along the waveguide. Because the effective refractive index of the material of the waveguide 11 is dependent on the wavelength $\lambda$ which is inversely proportional to the frequency f of the wave, wavelength dispersion occurs in the waveguide 11. This means that the fundamental wave of wavelength $\lambda$ and the second-harmonic wave of wavelength $\lambda/2$ propagate at different speeds, so that the two waves are periodically in phase opposition.

Figure 2A:
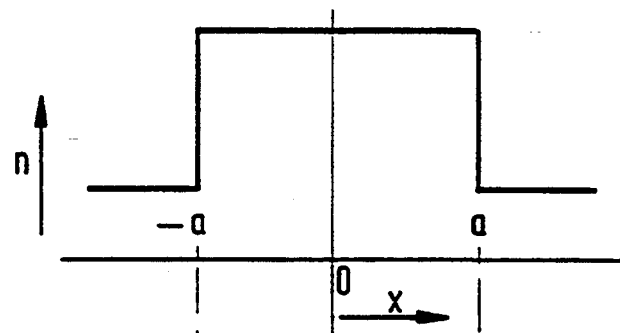
FIGS. 2a, 2b, 2c and 2d show the field distributions of different modes in a symmetrical planar optical component without satellite layers.
Figure 2B:
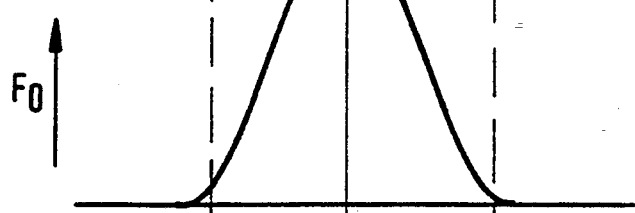
Figure 2C:
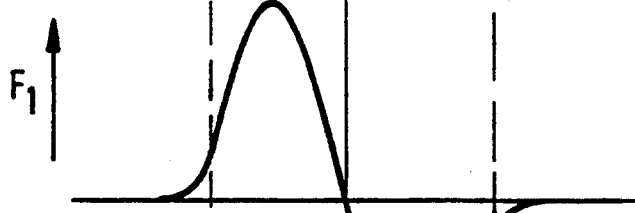
Figure 2D:
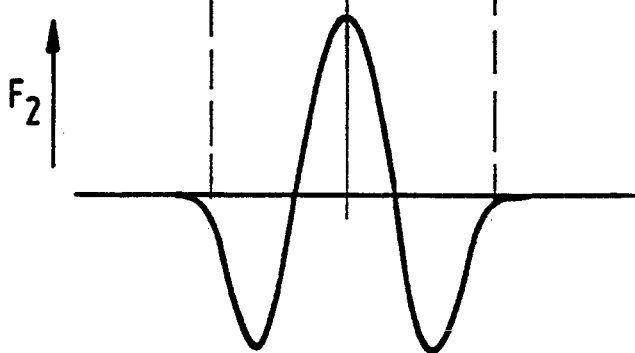

In order to achieve the desired phase matching, it has already been proposed to utilize the so-called modal dispersion occurring in the waveguide 11. In dependence on the geometry of a waveguide, an optical waveguide can propagate therein in different ways, that is to say according to different modes. In FIG. 2a a waveguide layer and its environment are represented by a refractive index profile. The thickness of the layer thus amounts to 2a. The FIGS. 2b, 2c and 2d show the field distributions of the zero-order, the first-order and the second-order modes of a wave, for example the fundamental wave. Each of these modes exhibits a different field distribution $F_m$ and experiences a different effective refractive index $n_{eff,m}$. As the order of the modes of propagation of the wave is higher, the effective refractive index for this wave becomes smaller. The condition to be satisfied for phase matching consists in that the effective refractive indices for the fundamental wave and the second-harmonic wave should be equal, or $\Delta n = n^\omega_{eff} - n^{2\omega}_{eff} = 0$. As a result, the second-harmonic wave will propagate with a higher order than the fundamental wave. Through a suitable choice of the materials and the layer thickness of the planar waveguide structure it can be ensured that this fundamental requirement for phase matching is satisfied.

However, if no further steps are taken, the efficiency of the frequency doubling in this waveguide structure will be comparatively low and inadequate in practice. This is because the efficiency is proportional to the degree of overlap of the field distributions of the fundamental wave and the second-harmonic wave. The degree of overlap $S_{ij}$ is given, as described in the book "Nonlinear optical properties of organic molecules and crystals" by D. S. Chemla and J. Zyss, Academic Press, 1987, pp. 426–427, by the so-called overlap integral $$S_{ij} = \frac{\int_{-a}^{a} (F_i^\omega)^2 F_j^{2\omega} dx}{\int_{-\infty}^{\infty} (F_i^\omega)^2 dx \sqrt{\int_{-\infty}^{\infty} (F_j^{2\omega})^2 dx}}$$

in which the integration region from $-a$ to $+a$ represents the thickness of the waveguide 11, $F^\omega_j$ is the field distribution of the fundamental wave, and $F^{2\omega}_j$ is the field distribution of the second-harmonic wave. The value of this overlap integral, however, is comparatively low for the overlap of field distributions of waves with different modes, as required for phase matching by means of modal dispersion.

Figures 3A, 3B:
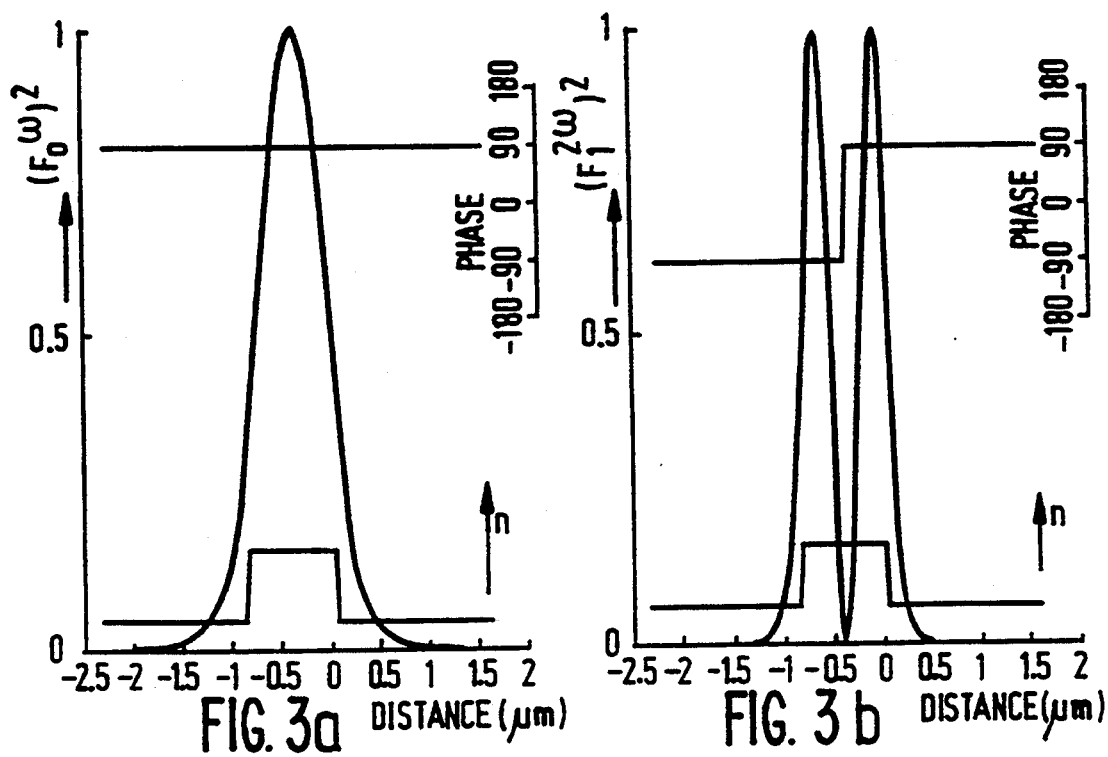
FIGS. 3a and 3b show the field distributions of the zero-order mode of the fundamental wave and the first-order mode of the second-harmonic wave, respectively, for an optical component without satellite layers.

FIG. 3a shows the field distribution of the zero-order mode of the fundamental wave and FIG. 3b shows the field distribution of the first-order mode of the second-harmonic wave. In these and similar, subsequent figures, the distance, in the waveguide 11, from the substrate 9 is plotted along the horizontal axis and thereabove the refractive index profile along this distance axis is given, whereas in the vertical direction the squares of the field distributions are plotted in arbitrary units. As appears from these figures, the overlap integral is even zero in this case.

In accordance with the present invention, a thin, high refractive index layer 15, a so-called satellite layer, is provided between at least the substrate 9 and the waveguide 11 of the component 7, said layer being in direct contact with the waveguide 11. FIG. 4 is a sectional view of such a component, together with the associated refractive index profile. The presence of a satellite layer 15 will influence the field distributions of the fundamental wave and the second-harmonic wave so that the overlap of the field distributions of the modes required for frequency increasing, and hence the efficiency of frequency increasing, increases, phase matching being obtained at the same time. The FIGS. 5a and 5b show the field distribution of the zero-order mode of the fundamental wave and that of the first-order mode of the second-harmonic wave, respectively, in the presence of a satellite layer.

Comparison of the FIGS. 5a and 5b with the FIGS. 3a and 3b, respectively, reveals that the maximum of the field distribution $F^{\omega}_0$ has been shifted towards the satellite layer, one of the lobes of the field distribution $F^{2\omega}_1$ having been attenuated and the maximum of the other lobe having been shifted towards the satellite layer. Phase matching being sustained, the value of the overlap integral is thus increased and hence also the frequency doubling efficiency.

Figure 7A:
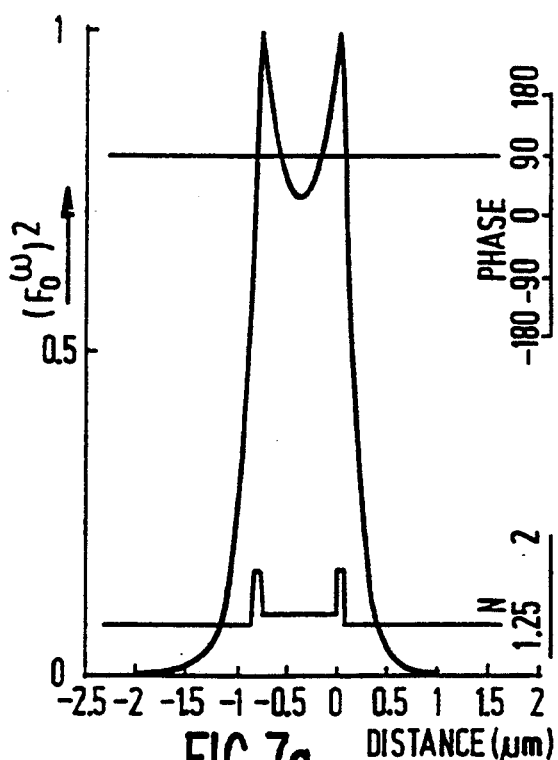
FIGS. 7a and 7b show the field distributions of the zero-order mode of the fundamental wave and the second-order mode of the second-harmonic wave, respectively, for the component shown in FIG. 6.
Figure 7B:
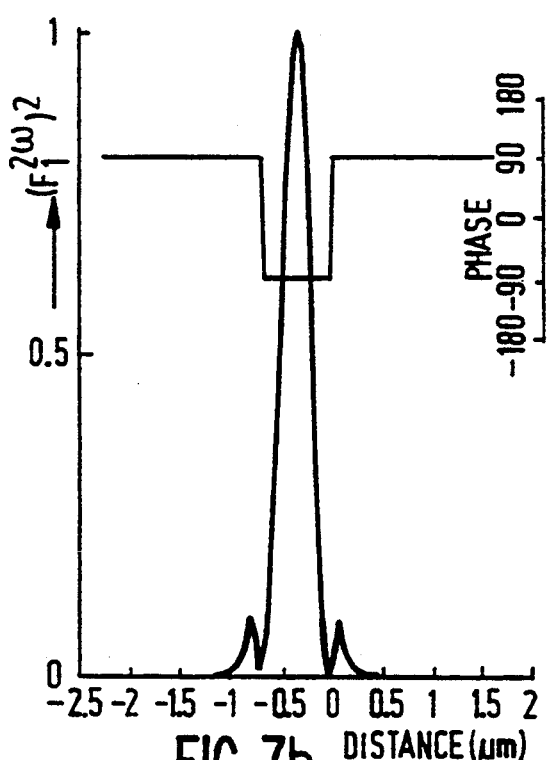

FIG. 6 shows an embodiment of the component in which a satellite layer 17 is also provided between the non-linear optical waveguide 11 and the cladding layer 13. Due to the presence of the second satellite layer 17, the field distributions of the modes of notably the second-harmonic wave deviate from the field distributions in the component without satellite layers as well as from the field distributions in the component shown in FIG. 4. The field distributions $F^{\omega}_0$ and $F^{2\omega}_2$ of the zero-order mode of the fundamental wave and the second-order mode of the second-harmonic wave, respectively, in the component shown in FIG. 6 are given in the FIGS. 7a and 7b. Because of the presence of the second satellite layer, the field distribution $F^{\omega}_0$ is symmetrical with respect to the centre of the waveguide 11, as opposed to the situation in FIG. 4. The two negative parts of the field distribution $F^{2\omega}_2$ have been substantially attenuated in comparison with FIG. 2d and the maximum of the field distribution $F^{2\omega}_2$ is situated at the centre of the waveguide 11. As a result, the field distribution $F^{2\omega}_2$ is situated substantially completely within $F^{\omega}_0$, so that the frequency doubling efficiency is comparatively high and in principle higher than that in the component shown in FIG. 4, phase matching still being maintained.

Figure 8A:
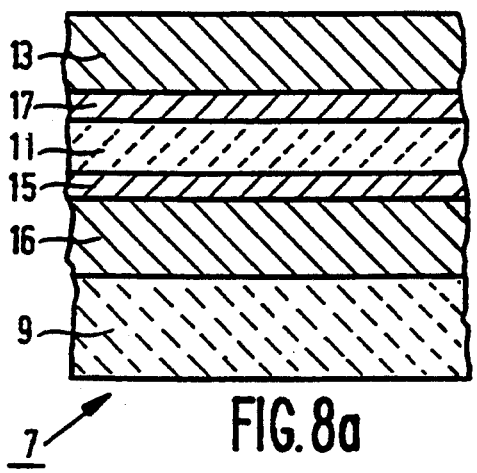
FIG. 8 is a sectional view of an embodiment of an optical component in accordance with the invention, comprising two satellite layers and two cladding layers.
Figure 8B:
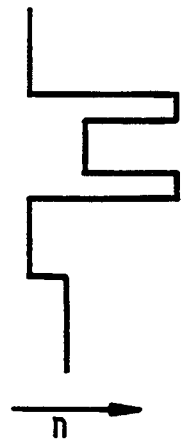

In the components shown in the FIGS. 4 and 6, a cladding layer 16, similar to and having the same function as the cladding layer 13, may be provided between the substrate 9 and the satellite layer 15 as shown in FIG. 8 for the embodiment comprising two satellite layers. In the latter case the entire component has a symmetrical construction. In the embodiment shown in FIG. 8, the cladding layer 13 may be omitted, its function then being taken over by the adjoining medium, for example air. A suitable overlap of the field distributions $F^{\omega}_0$ and $F^{2\omega}_2$ can then also be achieved if the thickness of the satellite layer 17 is slightly increased relative to that of the layer 17 in FIG. 8, for example 100 nm instead of 75 nm.

In all embodiments a layer of $SiO_2$ can be provided between the substrate 9 and the next layer, either a cladding layer or a satellite layer, in order to achieve optical separation of the inherently absorbing substrate from the other layers.

Various non-linear optical materials which are known to be appropriate as such can be used for the waveguide 11, provided that they can be deposited in comparatively thin layers and have a sufficiently low refractive index, so that satellite layers having a significantly higher refractive index are feasible. A very suitable material for the waveguide 11 is the poled polymer of the composition 25/75 MSMA/JMMA as described in the article "Poled polymers for frequency doubling of diodelasers" in Appl. Phys. Letters, Vol. 58 (5), Feb. 4, 1991, pp. 435–7. This polymer has a comparatively low refractive index, 1.52 for a wavelength of 800 nm and 1.56 for a wavelength of 400 nm, and can be deposited as a comparatively thin layer, for example having a thickness of 750 nm. When this or a similar polymer is used, the embodiment shown in FIG. 4 is preferably used, because no satellite layer is provided above the polymer layer thereof. The deposition of a satellite layer should generally take place at a high temperature, so that when such a layer is provided on a polymer layer, the latter layer could be affected.

$Si_3N_4$, AlN, $Nb_2O_5$ and $TiO_2$ are examples of suitable materials for the satellite layers. In comparison with the customary non-linear optical materials these materials have a sufficiently high refractive index, in the order of 1.8, can be readily etched and be deposited in the form of thin layers in a comparatively simple manner. Silicon nitride ($Si_3N_4$) from among these materials is to be preferred, because it enables manufacture of the component by means of standard technology for the manufacture of silicon semiconductor structures such as integrated circuits.

It has been assumed thus far that the optical component is a so-called planar waveguide. The invention can also be used in a so-called channel waveguide in which the radiation is confined within a very narrow region not only in a first direction, being the vertical direction in the FIGS. 4, 6 and 8, but also in a second direction, being the so-called lateral direction which extends perpendicularly to the first direction and to the direction of propagation. Generally speaking, a channel waveguide offers the advantage of a high energy density in comparison with a planar waveguide.

In the case of a channel waveguide comprising a satellite layer made of one of the above materials, the fact that these materials can be readily etched can be used to good advantage. The channel is then obtained by etching the satellite layer.

Figure 9A:
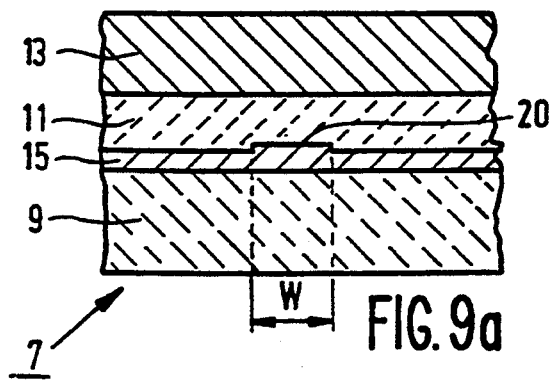
FIGS. 9 and 10 are sectional views of two embodiments of an optical component in accordance with the invention, comprising one satellite layer, the component being constructed as a channel waveguide.
Figure 9B:
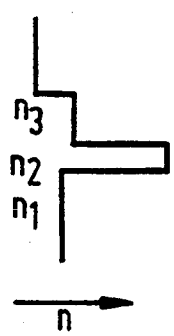

The major part of the surface of the $Si_3N_4$ layer can then be removed by etching to a given depth, so that the upper surface of this layer exhibits a shoulder 20 as shown in FIG. 9. This figure is a sectional view of the channel waveguide, taken transversely of the propagation direction of the radiation. It is alternatively possible to remove only a small strip of the substrate 9 by etching, so that the surface of the substrate comprises a narrow groove 21 as shown in FIG. 10.

Figure 11:
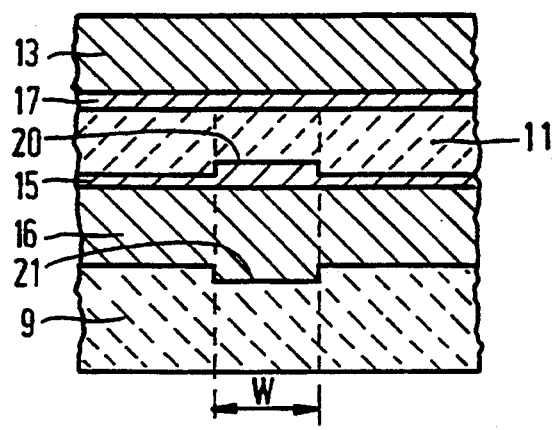
FIG. 11 is a sectional view of an embodiment of an optical component in accordance with the invention, comprising two satellite layers, the component being constructed as a channel waveguide.

Generally speaking, a channel waveguide can be realised by providing a shoulder on the satellite layer and/or by providing a groove in one of the layers having a refractive index which is lower than that of the satellite layer. FIG. 11 shows one of the feasible embodiments.

Figure 10:
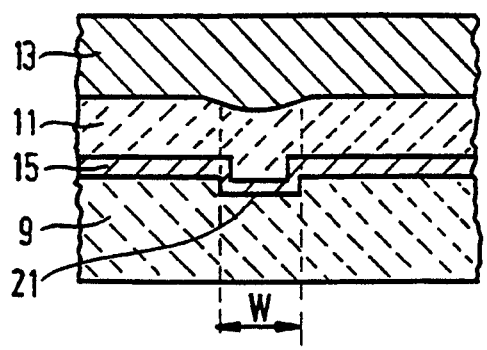

As appears from FIG. 10, a channel waveguide can be obtained by first etching a groove 21 into the substrate 9, after which the layer 15 having a high refractive index and the non-linear optical layer 11 are provided thereon.

Figure 12:
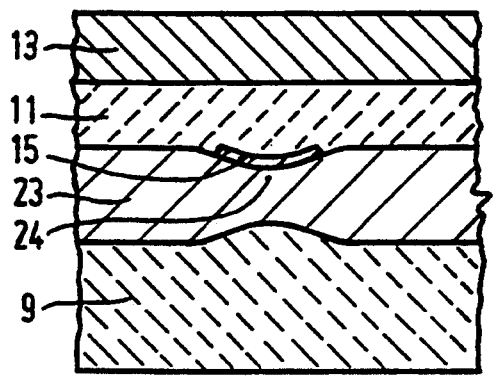
FIG. 12 is a sectional view of an embodiment of an optical component in accordance with the invention, constructed as a channel waveguide obtained by utilizing local oxidation of silicon (LOCOS)

Analogous to the method described in the non-prepublished European Patent Application No. 91202606.9, a channel waveguide can also be obtained by utilizing the so-called local oxidation of silicon (LOCOS) technology. A strip of material which transits substantially no oxygen is then provided on a silicon substrate which may already have been provided with a thin layer of silicon oxide. By local oxidation of silicon, where the oxidation is decelerated at the area of the strife, a groove is formed in the silicon oxide underneath the strip. As is shown in FIG. 12, on the substrate comprising the groove 24 there can again be provided a layer 15 having a high refractive index and a non-linear optical layer 11.

The advantage of the use of the LOCOS technique resides in the fact that the groove 24 in the silicon oxide layer 23 has very smooth walls, so that the loss of radiation is smaller than in the case of an etched groove.

When the strip is made of material having a high refractive index, for example $Si_3N_4$, it is not necessary to remove the strip by etching after formation of the groove; the strip can then serve as a satellite strip having a high refractive index.

The embodiments of the optical component for frequency increasing as described in the cited European Patent Application can be provided with a layer of a material having a high refractive index in accordance with the invention.

Figure 13:
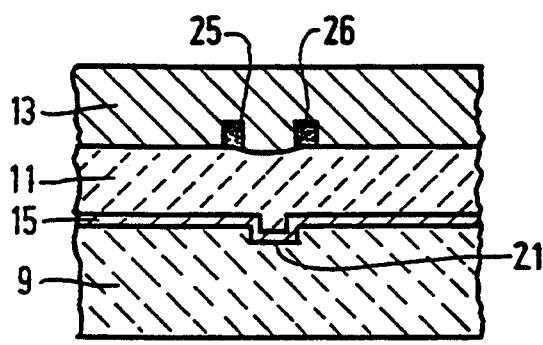
FIGS. 13 and 14 are sectional views of two embodiments of an optical component in accordance with the invention, constructed as a channel waveguide in conformity with the FIGS. 10 and 11 and provided with high refractive index strips extending, adjacent the channel in the lateral direction.
Figure 14:
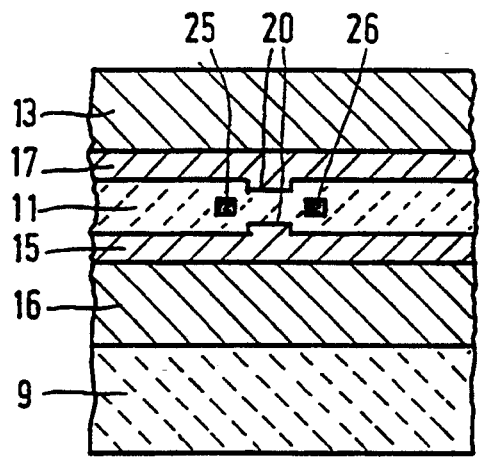

Because of the structure exhibited by a channel waveguide also in the said second direction, additional effects occur in these waveguides in comparison with a planar waveguide. For a width W of the shoulder or groove 20, 21, which approximates the order of magnitude of the thickness of the non-linear optical waveguide 11, for example for $W \approx 5$ μm, additional modal dispersion occurs. This can be compensated for by adaptation of the refractive index of the satellite layer or layers 15, 17. For very narrow shoulders or grooves, for example for $W \leq 5$ μm, it may be that this correction is inadequate. In that case laterally extending strips of a material having a high refractive index can be provided in the channel waveguide, adjacent the waveguide channel. FIGS. 13 and 14 show channel waveguides of the kind shown in the FIGS. 10 and 11 and provided with such strips 25 and 26.

The phase matching required for frequency doubling, however, can be sustained over only a limited wavelength range; this is due on the one hand to the wavelength-dependency of the refractive indices of the materials and on the other hand to the modal dispersion. The wavelength of the radiation to be frequency-doubled should be within the acceptance band of the non-linear optical component. The acceptance band is to be understood to mean herein the wavelength band of the radiation, around a nominal wavelength, which can be efficiently frequency-increased by the non-linear optical medium. Generally speaking, this acceptance band is comparatively narrow, typically of the order of 0.25 nm, so that comparatively severe requirements should be imposed as regards the diode laser.

The principal requirements in this respect are:

1) The wavelength band of the radiation emitted by the diode laser should be within the acceptance bandwidth of the non-linear optical component.

This requirement strongly reduces the yield of feasible diode lasers. Moreover, the small acceptance bandwidth impedes the use of pulsed diode lasers, because such diode lasers have a typical emission bandwidth of 5 nm. Because of their higher efficiency and stability, pulsed diode lasers are to be preferred over continuously driven diode lasers.

2) The emission wavelength of the diode laser should be very stable, so that this wavelength always remains within the acceptance bandwidth of the non-linear optical component. This implies that the exit spectrum of the diode laser may not change.

The latter requirement is also difficult to satisfy in practice, because the diode laser as well as the non-linear optical medium then require very accurate temperature stabilization, for example up to 0.5° C., since the behaviour of the diode laser as well as said medium may be strongly dependent on temperature.

Should the exit spectrum of the diode laser nevertheless change and its radiation obtain a different wavelength, substantially no radiation of doubled or increased frequency will emerge from the non-linear optical medium so that the component has become inactive.

The acceptance bandwidth can be increased by ensuring that, when the refractive index difference $\Delta n = n^{\omega}_{eff} - n^{2\omega}_{eff}$ for the nominal wavelength for which phase matching occurs equals zero, this value is retained also when the wavelength of the radiation applied to the component changes, so that:

$$\frac{\partial \Delta n}{\partial \lambda} = 0$$

or $$\frac{\partial}{\partial \lambda} n^{\omega}_{eff} - \frac{\partial}{\partial \lambda} n^{2\omega}_{eff} = 0$$

where $n^{\omega}_{eff}$ and $n^{2\omega}_{eff}$ are functions of the refractive indices for the fundamental wave and the second-harmonic wave, respectively, and of the thickness of the non-linear optical waveguide and the satellite layer or layers.

As demonstrated above, deposition of one or two satellite layers shifts the maximum of the field distribution of the fundamental wave on the one hand and the maximum of the field distribution of the second-harmonic wave on the other hand to different layers, so that an additional degree of freedom is obtained, enabling the above condition to be satisfied. This is because, as appears, for example from FIG. 5a, in the presence of a satellite layer the fundamental wave will be centered around the satellite layer 15.

In the wavelength range around the nominal wavelength of the fundamental wave, the comparatively high refractive index of the material of the satellite layer is hardly dependent on the wavelength. Because the thickness of the satellite layer is comparatively small, the fundamental wave will not fit completely in this layer and will propagate mainly outside this layer. Consequently, the effective refractive index for the fundamental wave is wavelength-dependent exclusively via the wavelength dispersion occurring in the layers surrounding the satellite layer and not via that in the satellite layer.

As the satellite layer is thicker, the part of the fundamental wave propagating outside the satellite layer decreases and the wavelength dependency of the fundamental wavelength on the layers surrounding the satellite layer also decreases. The foregoing means that the effective refractive index for the fundamental wave, $n^{\omega}_{eff}$, is determined mainly by the thickness of the satellite layer.

As appears from FIG. 5b, the second-harmonic wave is concentrated mainly in the non-linear optical waveguide 11. The waveguide 11 has a comparatively large thickness, for example it is a factor ten thicker than the satellite layer 15, so that the second-harmonic wave propagates hardly outside the waveguide. Consequently, a thickness variation of the waveguide will hardly influence the effective refractive index for the second-harmonic wave. For the wavelength range around the nominal wavelength of the second-harmonic wave, however, the refractive index of the material of the waveguide is strongly dependent on wavelength. Consequently, the effective refractive index for the second-harmonic wave will be determined mainly by the refractive index of the non-linear optical material.

Because of the differences in dependency of the effective refractive indices for the fundamental wave and the second-harmonic wave on the layer thickness and the refractive index of the layers in which the waves propagate, a suitable choice of the satellite layer thickness enables variation of the effective refractive index for the fundamental wave as a function of the wavelength, $\partial/\partial\lambda n^{\omega}_{eff}$, in the same way as the effective refractive index for the second-harmonic wave as a function of the wavelength, $\partial/\partial\lambda n^{2\omega}_{eff}$. The effect of a wavelength variation on $\Delta n$ can thus be substantially eliminated within a comparatively wide wavelength band around the nominal wavelength of the fundamental wave.

Figure 15:
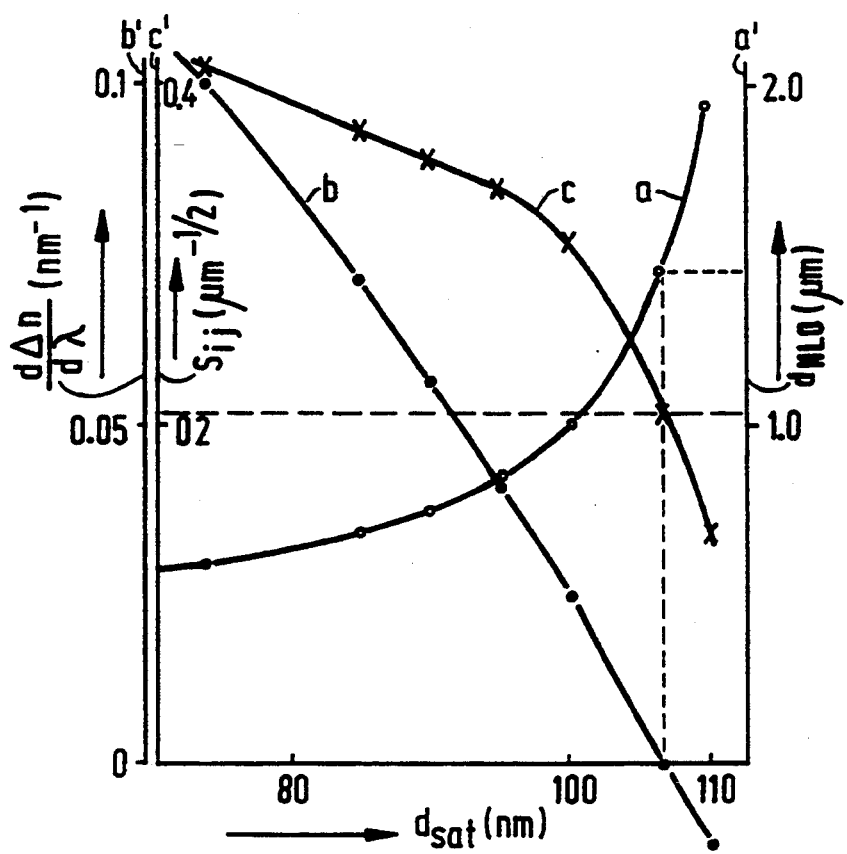
FIG. 15 shows the dependency of $\partial \Delta n / \partial \lambda$, being the value of the overlap integral $S_{ij}$, and the thickness of the polymer layer $d_{NLO}$ as a function of the satellite layer for phase matching at 850 nm in a structure as shown in FIG. 4.

This idea, forming pan of the present invention, has been experimentally confirmed. By way of example, FIG. 15 shows the results of such an experiment for a waveguide structure comprising one satellite layer, as shown in FIG. 4, which is designed for a fundamental wavelength of 850 nm and in which phase matching ($\Delta n=0$) is achieved. The non-linear optical waveguide 11 consists of a polymer of the composition 25/75 MSMSA/MMA and the satellite layer consists of $Si_3N_4$. The figure shows three curves a, b, and c and the associated vertical scale graduations a', b' and c' for the required thickness ($d_{NLO}$ in $\mu m$) of the non-linear optical waveguide 11, $\partial\Delta n/\partial\lambda$ (in $nm^{-1}$), and the value of the overlap integral $S_{ij}$ (in $\mu m^{-\frac{1}{2}}$), respectively, as a function of the thickness ($d_{sat}$ in nm) of the satellite layer 15. The figure shows that there is a thickness $d_{sat}$, approximately 107 nm, for which $\partial\Delta n/\partial\lambda=0$ and the value of the overlap integral is reasonably large, $S_{ij}$ being approximately 0.2 $\mu m^{-\frac{1}{2}}$. The thickness required for the non-linear optical waveguide is then approximately 1.44 $\mu m$.

Figure 16:
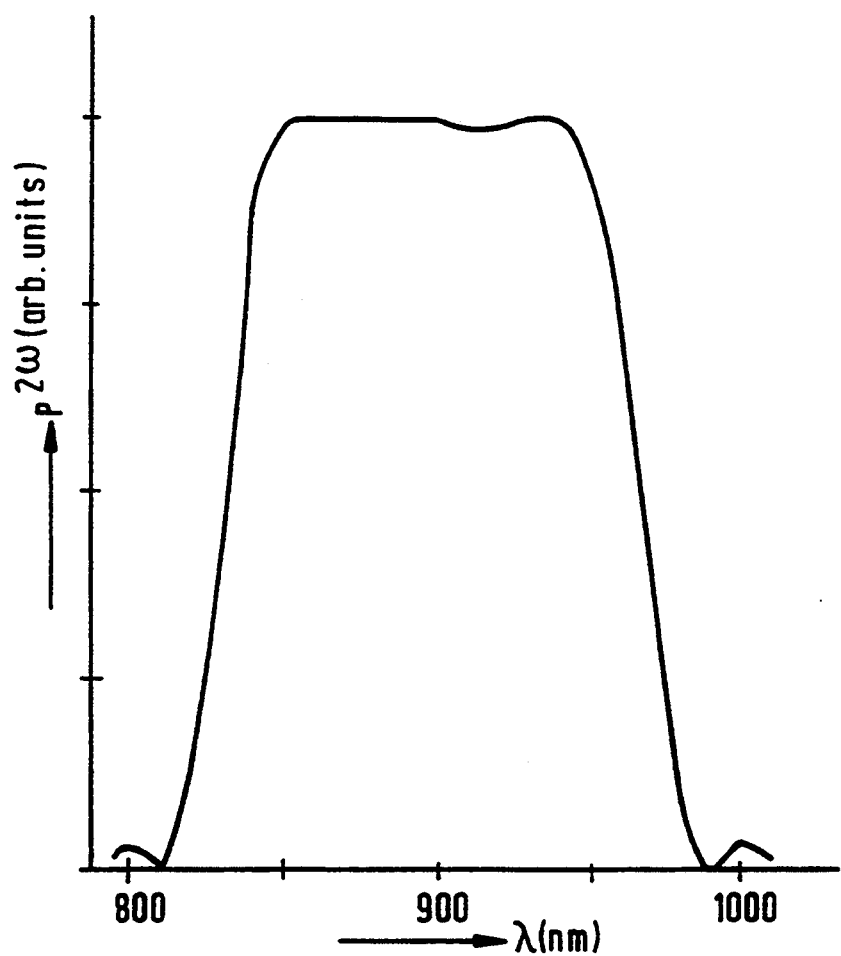
FIG. 16 shows the power $P^{2\omega}$ of the second-harmonic wave, in arbitrary units, as a function of the wavelength X of the fundamental wave for a component having parameters similar to those of the component shown in FIG. 4.

FIG. 16 shows the power $P^{2\omega}$ of the second-harmonic wave, in arbitrary units, as a function of the wavelength $\lambda$ of the fundamental wave for a component having similar parameters and a lateral length of 10 mm, optimized for a wavelength $\lambda$ around 900 nm. It appears that around 900 nm the waveguide has an acceptance bandwidth of approximately 130 nm. The acceptance bandwidth is the distance between the two points on the horizontal axis for which the value $P^{2\omega}$ amounts to half the maximum value of $P^{2\omega}$, so the FWHM. In practice an acceptance bandwidth of 10 nm suffices, so that adequate tolerances exist as regards the thickness of the satellite layer.

Phase matching which is not wavelength-critical can also be realised when other materials are used for the non-linear optical waveguide and the satellite layer and also for other thicknesses of these layers.

The above idea can also be used for a frequency-doubling component comprising two satellite layers in order to impart a comparatively wide acceptance band also to this component.

The fact that the invention has been described with reference to a frequency-doubling component does not mean that the invention is restricted thereto. The invention can also be used in optical components in which a frequency increase other than doubling occurs. In this respect there are to be mentioned guides which receive radiation of two different wavelengths and in which radiation of a frequency equal to the sum of the two frequencies is generated.

We claim:

1. An optical component for increasing the frequency of a fundamental wave of electromagnetic radiation, which component comprises a substrate and a non-linear optical waveguide having a refractive index which is higher than that of the substrate, phase matching occurring between mutually different modes of the fundamental wave and a higher-harmonic wave, wherein the improvement comprises that at least between the substrate and the waveguide there is provided a satellite layer which has a refractive index which is higher than that of the waveguide.

2. An optical component as claimed in claim 1, wherein a second satellite layer is provided on a second side of the non-linear optical waveguide, which second satellite layer has a refractive index which is higher than that of the waveguide.

3. An optical component as claimed in claim 1, wherein the component is constructed as a waveguide.

4. An optical component as claimed in claim 1, wherein the non-linear optical material is a polymer.

5. An optical component as claimed in claim 1, wherein the satellite layer consists of $Si_3N_4$.

6. An optoelectronic element for increasing the frequency of a fundamental wave of electromagnetic radiation, which element comprises a support on which there is provided a diode laser for generating the electromagnetic radiation and an optical component in which the frequency increase takes place, wherein the component is a component as claimed in claim 1, the active layer of the diode laser and the layer of the component in which the fundamental wave propagates being situated one in the prolongation of the other, the exit face of the diode laser and the entrance face of the component being situated so as to face one another.

* * * * *